US009517696B2

(12) United States Patent
Zhou et al.

(10) Patent No.: US 9,517,696 B2
(45) Date of Patent: Dec. 13, 2016

(54) VEHICLE CONTROL SYSTEM

(71) Applicant: General Electric Company, Schenectady, NY (US)

(72) Inventors: Ronghui Zhou, Shanghai (CN); Jian Zhou, Shanghai (CN); Fei Li, Shanghai (CN); Xi Lu, Shanghai (CN); Fengcheng Sun, Shanghai (CN); Xiangming Shen, Shanghai (CN); Hai Qiu, Shanghai (CN); Pengju Kang, Yorktown Heights, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/514,957

(22) Filed: Oct. 15, 2014

(65) Prior Publication Data

US 2015/0120130 A1    Apr. 30, 2015

(30) Foreign Application Priority Data

Oct. 25, 2013  (CN) .......................... 2013 1 0512240

(51) Int. Cl.
*G01M 17/00* (2006.01)
*B60L 3/12* (2006.01)
(Continued)

(52) U.S. Cl.
CPC ................. *B60L 3/12* (2013.01); *B60L 1/003* (2013.01); *B60L 3/0084* (2013.01); *B60L 3/04* (2013.01);
(Continued)

(58) Field of Classification Search
CPC .............. B60L 3/12; B60L 3/04; B60L 15/20; B60L 3/0084; B60L 11/005; B60L 1/003; B60L 2250/26; B60L 2240/423; B60L 2240/427; B60L 2240/421; B60L 2240/429; B60L 2240/425
See application file for complete search history.

(56) References Cited

U.S. PATENT DOCUMENTS 4,841,159 A * 6/1989 Evans .................. H03K 17/735
219/497
5,369,540 A   11/1994 Konrad et al.
(Continued)

FOREIGN PATENT DOCUMENTS

CN    101909942 A    12/2010
CN    202115450 U     1/2012
(Continued)

OTHER PUBLICATIONS

Ke et al., "CAN and its Application for Hybrid Electric Vehicles", Journal of Tsinghua University(Science and Technology, Aug. 2003.
(Continued)

*Primary Examiner* — Mary Cheung
(74) *Attorney, Agent, or Firm* — Meagher Emanuel Laks Goldberg & Liao, LLP

(57) ABSTRACT

A system includes a contactor system, a vehicle control unit, and a fault diagnostic system. The contactor system includes one or more contactors. The vehicle control unit is coupled to the contactor system via a first connection and a second connection. The vehicle control unit is configured to provide a controlling signal to the contactor system through at least one of the first connection and the second connection to control the one or more contactors. The fault diagnostic system is configured to identify faults occurring in the first connection and the second connection. A method is also provided.

20 Claims, 2 Drawing Sheets

Figure 1:
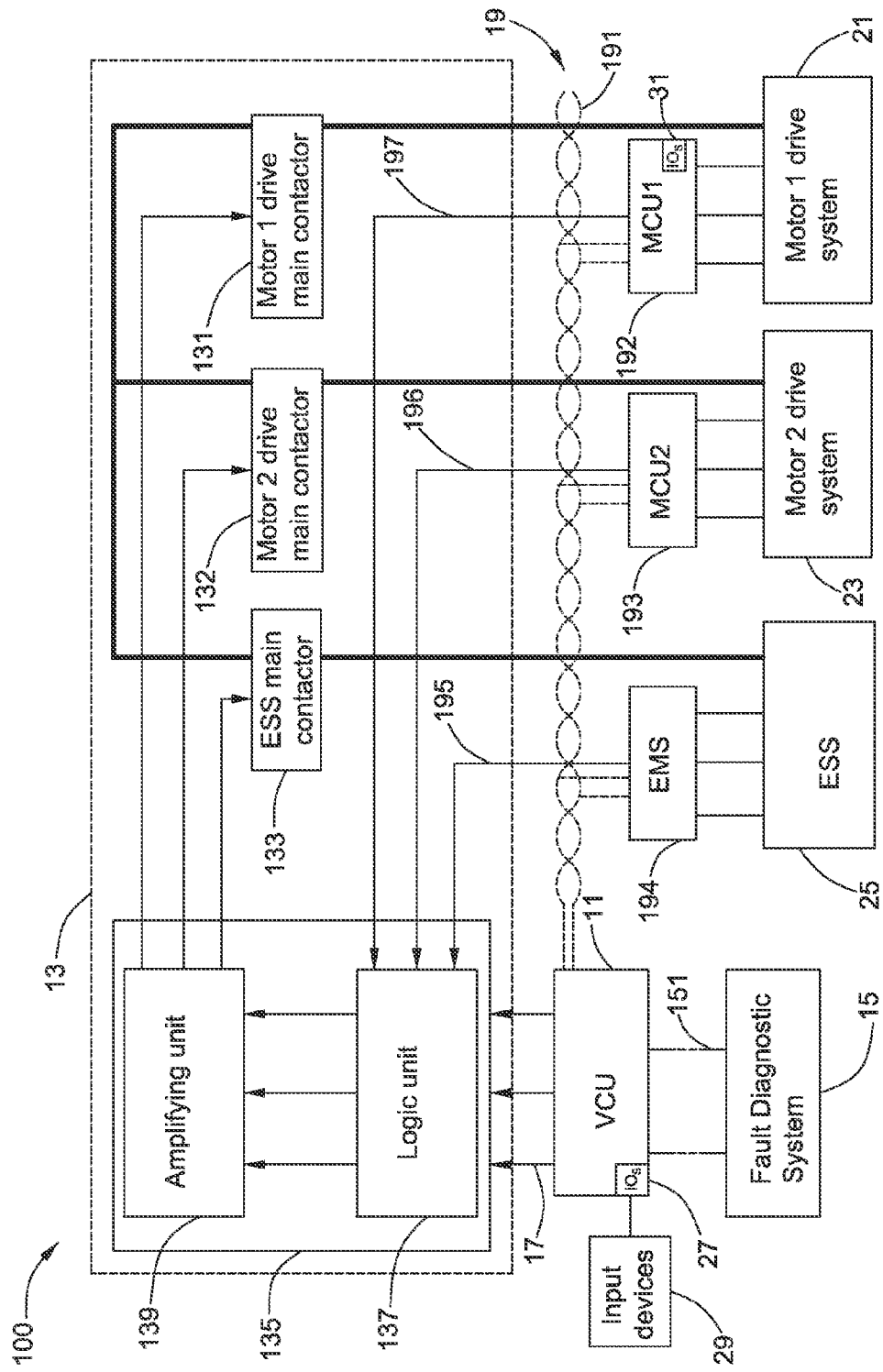

(51) Int. Cl.
  *B60L 1/00* (2006.01)
  *B60L 3/00* (2006.01)
  *B60L 3/04* (2006.01)
  *B60L 11/00* (2006.01)
  *B60L 15/20* (2006.01)

(52) U.S. Cl.
  CPC .............. *B60L 11/005* (2013.01); *B60L 15/20* (2013.01); *B60L 2240/421* (2013.01); *B60L 2240/423* (2013.01); *B60L 2240/425* (2013.01); *B60L 2240/427* (2013.01); *B60L 2240/429* (2013.01); *B60L 2250/26* (2013.01); *Y02T 10/645* (2013.01); *Y02T 10/7022* (2013.01); *Y02T 10/72* (2013.01); *Y02T 10/7275* (2013.01)

(56) References Cited

U.S. PATENT DOCUMENTS

| | | | |
|---|---|---|---|
| 7,406,370 B2 | 7/2008 | Kojori et al. | |
| 8,099,179 B2 | 1/2012 | Naik et al. | |
| 8,358,578 B2 | 1/2013 | Murashige et al. | |
| 8,457,824 B2 | 6/2013 | Sopko et al. | |
| 2011/0001486 A1* | 1/2011 | Abouda | G01R 31/007 324/537 |
| 2013/0140884 A1 | 6/2013 | Furui et al. | |
| 2013/0234504 A1* | 9/2013 | Morita | H01M 10/425 307/9.1 |

FOREIGN PATENT DOCUMENTS

| | | |
|---|---|---|
| CN | 202641573 U | 1/2013 |
| CN | 202995390 U | 6/2013 |
| JP | 2013119270 A | 6/2013 |
| KR | 20100039638 A | 4/2010 |

OTHER PUBLICATIONS

Oudghiri et al., "A Fuzzy Approach for Sensor Fault-Tolerant Control of Vehicle Lateral Dynamics", IEEE International Conference on Control Applications, (CCA), pp. 1221-1226, Oct. 1-3, 2003.

Jeong et al., "Fault Detection and Fault Tolerant Control of Interior Permanent Magnet Motor Drive System for Electric Vehicle", 38th IAS Annual Meeting. Conference Record of the Industry Applications Conference, vol. 3, pp. 1458-1463, Oct. 12-16, 2003.

Zhao et al., "System Design and Development of Parallel-Hybrid Electric Vehicle Based on CAN Bus", Proceedings of the Eighth International Conference on Electrical Machines and Systems, ICEMS, vol. 1, pp. 828-832, Sep. 27-29, 2005.

Zhu et al., "Hardware-in-the-Loop Simulation of Pure Electric Vehicle Control System", International Asia Conference on Informatics in Control, Automation and Robotics, CAR '09., pp. 254-258, Feb. 1-2, 2009.

Unofficial English Translation of Chinese Office Action issued in connection with corresponding CN Application No. 201310512240.5 on Mar. 31, 2016.

* cited by examiner

VEHICLE CONTROL SYSTEM

BACKGROUND

Embodiments of the invention relate generally to a vehicle control system and a method, and more particularly to a fault tolerant system and method for a vehicle to provide a redundant signal.

Reliability and safety is critical for vehicles, not only in the component manufacturing process but also during the overall drive train integration period. Vehicles conventionally include a vehicle control unit configured to control subsystems of the vehicle, such as a motor drive system and an energy storage system. The vehicle control unit receives signals from the subsystems, provides control signals to the subsystems to operate the subsystems, and monitors health statuses of the subsystems. Currently, the vehicle may not work as expected when the vehicle control unit or connections between the vehicle control unit and one or more subsystems are malfunctioning, reducing reliability of the vehicle.

It is desirable to provide a system and a method to address at least one of the above-mentioned problems.

BRIEF DESCRIPTION

In accordance with one embodiment disclosed herein, a system is provided. The system includes a contactor system, a vehicle control unit, and a fault diagnostic system. The contactor system includes one or more contactors. The vehicle control unit is coupled to the contactor system via a first connection and a second connection. The vehicle control unit is configured to provide a controlling signal to the contactor system through at least one of the first connection and the second connection to control the one or more contactors. The fault diagnostic system is configured to identify faults occurring in the first connection and the second connection.

In accordance with another embodiment disclosed herein, a method is provided. The method includes providing a first connection and a second connection each coupled between a contactor system and a vehicle control unit. The method further includes monitoring fault statuses of the first connection and the second connection. And the method further includes providing, via the vehicle control unit, a controlling signal to the contactor system through at least one of the first connection and the second connection according to the fault statuses to control one or more contactors of the contactor system.

DRAWINGS

Figure 2:
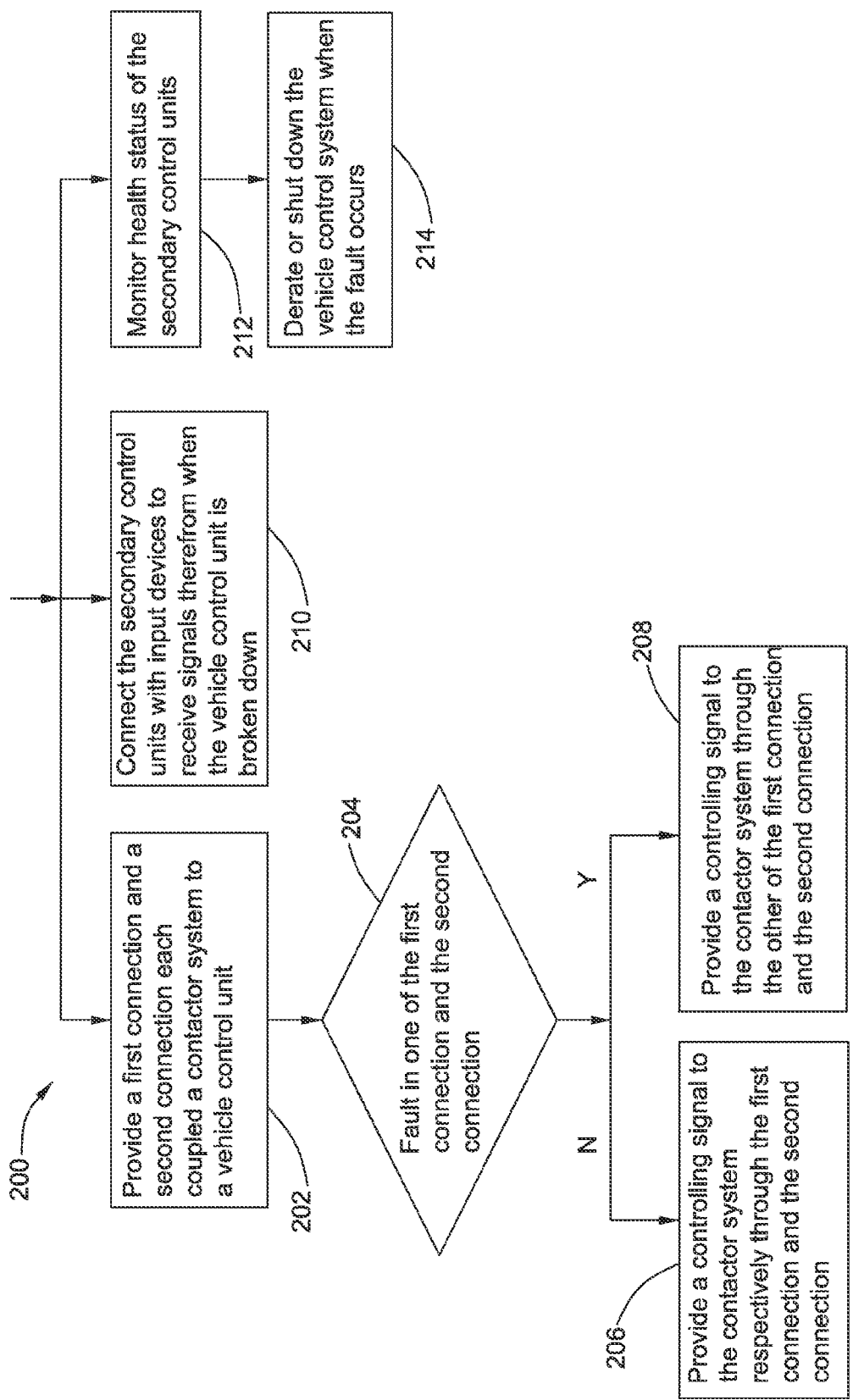

These and other features and aspects of the present disclosure will become better understood when the following detailed description is read with reference to the accompanying drawings in which like characters represent like parts throughout the drawings, wherein:

FIG. 1 is a schematic diagram of a vehicle control system for a vehicle in accordance with an embodiment; and FIG. 2 is a schematic diagram of a method in accordance with an embodiment.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a", and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

FIG. 1 illustrates a schematic diagram of a vehicle control system 100 for a vehicle in accordance with an embodiment. The vehicle may be, for example, an electric vehicle, or a hybrid vehicle. The vehicle may be, for example, an electric tractor or an industrial forklift for agricultural or industrial work. The vehicle control system 100 includes a vehicle control unit 11, a contactor system 13 and a fault diagnostic system 15. The contactor system 13 includes one or more contactors 131-133. The vehicle control unit 11 is coupled to the contactor system 13 via a first connection 17 and a second connection 19. The vehicle control unit 11 is configured to provide a controlling signal to the contactor system 13 through at least one of the first connection 17 and the second connection 19 to control the contactors 131-133. The fault diagnostic system 15 is configured to identify faults occurring in the first connection 17 and the second connection 19. In one embodiment, the fault diagnostic system 15 is coupled to the vehicle control unit 11 via a connection 151, such as controller area network (CAN) bus, Ethernet, or any other connections transmitting signals. In another embodiment, the fault diagnostic system 15 is embedded in the vehicle control unit 11.

In this embodiment, the contactors 131-133 include a first motor drive main contactor 131, a second motor drive main contactor 132 and an energy storage system (ESS) main contactor 133. The first motor drive main contactor 131 is coupled to a first motor drive system 21 which is configured to drive a first motor (not shown). The first motor may provide traction power to the vehicle to drive the vehicle. The second motor drive main contactor 132 is coupled to a second motor drive system 23 which is configured to drive a second motor (not shown). The second motor, in one embodiment, may provide power take-off (PTO) power for the agricultural or industrial operation. The ESS main contactor 133 is coupled to an ESS 25 which is configured to provide energy for the first and second motors. The ESS, in one embodiment, may include a battery, super-capacitor, or a combination thereof for the electric vehicle. The contactors 131-133 are movable between a closed position and an open position. In some embodiments, the contactors may include any other contactors. In another embodiment, the second motor main contactor 132 may be omitted for a vehicle having one motor.

The contactor system 13, in this embodiment, includes a contactor drive device 135 coupled to the contactors 131-133 and configured to drive the contactors 131-133 according to the controlling signal. In this embodiment, the contactor drive device 135 includes a logic unit 137 and an amplifying unit 139 coupled to the logic unit 137. The logic unit 137 is coupled to the vehicle control unit 11 and capable of logical operation of signals. The logic unit 137 may include an analog circuit, a digital circuit, or a combination thereof. The logic unit 137, in one embodiment, may include a switch matrix having a number of switches arranged to perform the logical operation. The amplifying unit 139 is configured to amplify signals to drive the contactors 131-133.

In this embodiment, the first connection 17 may be an input/output (10) connection which includes IO ports (not shown) in the vehicle unit 11 and the contactor system 13, and electrical wires connected the IO ports to transmit signals. The second connection 19, in this embodiment, may include a CAN bus 191 which the vehicle control unit 11 is connected to. The second connection 19 includes one or more secondary control units 192-194 coupled between the vehicle control unit 11 and the contactor system 13 and configured to control the contactors 131-133 according to the controlling signal from the vehicle control unit 11. The secondary control units 192-194 are also configured to control corresponding subsystems, such as the first motor drive system 21, the second motor drive system 23, and the ESS 25. The secondary control units 192-194 are coupled to the CAN bus 191 which may transmit signals between the vehicle control unit 11 and the secondary control units 192-194. And the secondary control units 192-194 are coupled to the logic unit 137 via, for example, an IO connection 195-197. The vehicle control unit 11 sends the controlling signals to the secondary control units 192-194 and request the secondary control units 192-194 to open or close the contactors 131-133.

In this embodiment, the secondary control units 192-194 include a first motor control unit 192 controlling the first motor main contactor 131 and the first motor drive system 21, a second motor control unit 193 controlling the second motor main contactor 132 and the second motor drive system 23, and an energy manage system (EMS) 194 controlling the ESS main contactor 133 and the ESS 25. In another embodiment, the second motor control unit 193 may be omitted for the vehicle having one motor. In yet another embodiment, the second connection 19 may include one or more than three secondary control units according to particular applications.

The first connection 17 and the second connection 19, in another embodiment, may be any other connections, such as wireless connections. In this embodiment, the contactors 131-133 are connected to the vehicle control unit 11 through the first connection 17 and the second connection 19, respectively.

The vehicle control unit 11 is configured to provide the controlling signal to the contactor system 13 respectively through the first connection 17 and the second connection 19 to control the contactors 131-133 when there is no fault in the first connection 17 and the second connection 19. In one embodiment, the vehicle control unit 11 is configured to provide the controlling signal to the contactor system 13 through one of the first connection 17 and the second connection 19 to control the contactors 131-133 when a fault occurs in the other of the first connection 17 and the second connection 19. The fault diagnostic system 15 identifies whether a fault occurs in the first connection 17 or the second connection 19 before the vehicle control unit 11 sends the controlling signals. As nonlimiting examples, the fault may be a pin of the TO ports is short to ground or power, an TO register is latched to 1 or 0, or the secondary control unit is malfunctioning.

The controlling signal may be a lower electric level or a higher electric level respectively represented as a logic signal 0 or 1 to control the contactor 131-133 to open or close. In one embodiment, the contactor 131-133 is closed when the logic signal 1 is provided, otherwise the contactor 131-133 is open. The logic unit 137 of the contactor drive system 135 is configured to generate a contactor operation signal for the contactors 131-133 through a logical operation of the controlling signal from the first connection 17 and the controlling signal from the second connection 19.

When there is no fault in the first connection 17 and the second connection 19, the controlling signal is transmitted from the first connection 17 and the second connection 19 respectively, and the logic unit 137 generates the contactor operation signal through an AND logical operation of the controlling signals from the first connection 17 and the second connection 19. When there is a fault in the first connection 17 or the second connection 19, for example, the fault occurs in the first connection 17, the controlling signal is transmitted from the second connection 19 which is healthy. The vehicle control unit 11 informs the logic unit 137 of the fault status with a pre-defined logic signal. In one embodiment, the logic unit 137 sets the signal from the first connection 17 as the logic signal 0, and generates the contactor operation signal through an OR logical operation of the controlling signal and the logic signal 0. In another embodiment, the logic unit 137 sets the signal from the first connection 17 as the logic signal 1, and generates the contactor operation signal through the AND logical operation of the controlling signal and the logic signal 1. The amplifying unit 139 amplifies the contactor operation signal to drive the contactors 131-133. If the fault occurs in the second connection 19, an operation is similar to the operation described above. Accordingly, the vehicle can work normally when one of the first connection 17 and the second connection 19 is malfunctioning.

In another embodiment, the vehicle control unit 11 is configured to control the contactors 131-133 to open through one of the first connection 17 and the second connection 19 when a fault occurs in the other of the first connection 17 and the second connection 19. In this condition, the vehicle control unit 11, in one embodiment, provides the logic signal 0 as the controlling signal through the connection without fault to make the contactors 131-133 always open so as to stop operation of the vehicle.

In this embodiment, the vehicle control unit 11 includes one or more first ports 27 coupled to one or more input devices 29 to receive signals therefrom, and the secondary control units 192-194 include one or more second ports 31 capable of coupling to the input devices 29 to receive signals therefrom. The input devices 29 may include, for example, an accelerator pedal, a brake pedal, one or more vehicle control switches, or any other devices used to input command signals to the vehicle control unit 11 to control the vehicle according to the command signals. The input devices 29 are connected to the vehicle control unit 11 via the first ports 27.

When the first ports 27 or the vehicle control unit 11 are malfunctioning, the vehicle control unit 11 cannot control the secondary control unit 192-194 and the vehicle control system 100 according to the command signals. In this condition, the input devices 29 is disconnected from the first ports 27, and then connected to the secondary control units 192-194 via the second ports 31, so that the secondary control units 192-194 can receive the command signals from the input devices 29. The secondary control units 192-194 include programs performing corresponding functions in the vehicle control unit 11 so as to control the vehicle to work according to the command signals. Accordingly, the vehicle may work normally when the first ports 27 or the vehicle control unit 11 are malfunctioning. In this embodiment, the second ports 31 are in the first motor control unit 192 which control the vehicle running, and the input devices 29 provide the command signals for the cruise of the vehicle.

In one embodiment, at least three of the secondary control units 192-194 detect the same information from a vehicle system. In this embodiment, three secondary control units 192-194 are provided. In another embodiment, more than three secondary control units are provided. The secondary control units 192-194 each have sensors (not shown) to detect, for example, a DC-link (Direct Current-link) voltage or a DC-link current from a DC-link of a vehicle system, a motor phase voltage, a motor phase current or a motor speed. The sensors are integrated with the secondary control units 192-194. In one example, the secondary control units 192-194 each transmit signals, such as the DC-link voltage and the DC-link current, from the sensors to the vehicle control unit 11. In another example, the signals provided by the secondary control unit 192-194 to the vehicle control unit 11 are derived from the detected signals via the sensors. For example, the motor output power and the motor output torque are determined according to the motor phase voltage and the motor phase current from the motor.

The vehicle control unit 11 cross-checks the signals being fed back from the different secondary control units 192-194 and representing the same information of the vehicle system to identify a fault. The vehicle control unit 11 compares every two of the signals from the different secondary control units 192-194. If differences between every two signals are in an allowed error range, there is no fault in the secondary control units 192-194. The allowed error range is determined in the vehicle control unit 11, and different allowed error ranges are determined for the different signals. If the differences between one signal and the other signals are out of the allowed error range, a fault occurs in the corresponding secondary control unit 192-194. When the fault occurs, the vehicle control unit 11 may derate the control or shut down the system.

In another embodiment, the vehicle control unit 11 compares two signals being fed back from two different secondary control units 192-194 and representing the same information of the vehicle system to identify whether a fault occurs, and the fault diagnostic system 15 diagnoses the fault when the fault occurs. If the difference between the two signals is out of the allowed error range, there is a fault in one of the secondary control units 192-194 providing the two signals. The fault diagnostic system 15 then diagnoses the fault in which secondary control units 192-194 according to some signals and information of the vehicle control system 100.

In yet another embodiment, the vehicle control unit 11 compares a signal being fed back from one secondary control unit 192, 193, or 194 and an estimation signal representing the same information of the vehicle system as the signal from the secondary control unit 192, 193, or 194 to identify a fault. The estimation signal may be estimated in the vehicle control unit 11 according to the operation of the vehicle control system 100. If a difference between the signal from the secondary control unit 192, 193, or 194 and the estimation signal is out of the allowed error range, there is a fault in the secondary control unit 192, 193, or 194. Then the vehicle control unit 11 may derate the control or shut down the system.

FIG. 2 illustrates a schematic diagram of a method 200 in accordance with an embodiment. In block 202, a first connection and a second connection are provided, each of which is coupled a contactor system to a vehicle control unit. The first connection and the second connection may be employed the first connection 17 and the second connection 19 in the embodiments of FIG. 1. In block 204, fault statuses of the first connection and the second connection are monitored. The fault in one of the first connection and the second connection is identified when the fault occurs.

A controlling signal is provided via the vehicle control unit to the contactor system through at least one of the first connection and the second connection according to the fault statuses to control one or more contactors of the contactor system. In block 206, the controlling signal is provided to the contactor system respectively through the first connection and the second connection to control the one or more contactors when there is no fault in the first connection and the second connection. And then a contactor operation signal is generated through a logical operation of the controlling signal from the first connection and the controlling signal from the second connection to operate the contactors. The contactor operation signal is amplified to drive the contactors.

In block 208, in one embodiment, the controlling signal is provided to the contactor system through one of the first connection and the second connection to control the contactors when a fault occurs in the other of the first connection and the second connection. The fault statuses of the first connection and the second connection are monitored before the control signal is provided. Accordingly, the vehicle can work normally. In block 208, in another embodiment, the contactors are controlled to open through one of the first connection and the second connection when a fault occurs in the other of the first connection and the second connection. Accordingly, the vehicle is stopped when the fault occurs.

The second connection includes one or more secondary control units coupled between the vehicle control unit and the contactor system, and the method 200 further includes connecting the secondary control units with one or more input devices to receive signals therefrom when the vehicle control unit is broken down, in block 210. The input devices are coupled to the vehicle control unit to input command signals when the vehicle control unit is healthy. When the vehicle control unit is broken down, the input devices are disconnected from the vehicle control unit and connected to the secondary control unit.

The health status of the secondary control unit is monitored, in block 212. The secondary control unit includes sensors to detect signals from the vehicle system. The health status of the secondary control unit includes health status of the sensors. In one embodiment, at least three signals being fed back from different secondary control units and representing the same information are cross-checked to identify a fault. The fault may be in one of the secondary control units. In another embodiment, two signals being fed back from different secondary control units and representing the same information are compared to identify whether a fault occurs, and the fault is diagnosed when the fault occurs. In yet another embodiment, a signal being fed back from a secondary control unit and an estimation signal representing the same information as the signal from the secondary control unit are compared to identify the fault. The vehicle control system works normally when there is no fault. The vehicle control system is derated or shut down when the fault occurs, in block 214.

While the actions of the method 200 are illustrated as functional blocks, the order of the blocks and the separation of the actions among the various blocks shown in FIG. 2 are not intended to be limiting. For example, the blocks may be performed in a different order and an action associated with one block may be combined with one or more other blocks or may be sub-divided into a number of blocks.

While embodiments of the invention have been described herein, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

What is claimed is:

1. A method, comprising:
   coupling one or more contactors to a contactor drive device to form a contactor system;
   coupling a vehicle control unit to the contactor drive device via a first connection and a second connection;
   coupling one or more secondary control units to the contactor drive device via the second connection;
   configuring a fault diagnostic system to monitor a fault status of the first connection and the second connection;
   configuring the vehicle control unit to provide a controlling signal to the contactor system through at least one of the first connection and the second connection according to the fault status; and
   configuring the secondary control units to provide a controlling signal to the contactor system through the second connection according to the fault status.

2. The method of claim 1, wherein configuring the vehicle control unit further comprises providing the controlling signal to the contactor system through the second connection when a fault occurs in the first connection.

3. The method of claim 2, wherein configuring the vehicle control unit further comprises controlling the one or more contactors to open when a fault occurs in the first connection.

4. The method of claim 1, wherein configuring the vehicle control unit further comprises cross-checking signals being fed back from the secondary control units to identify whether a fault occurs.

5. The method of claim 1, wherein configuring the vehicle control unit further comprises comparing a signal being fed back from a secondary control unit and an estimation signal to identify whether a fault occurs.

6. A system, comprising:
   a contactor system comprising:
      one or more contactors; and
      a contactor drive device coupled to the one or more contactors;
   a vehicle control unit coupled to the contactor drive device via a first connection and a second connection configured to provide a controlling signal to the contactor system through at least one of the first connection and the second connection to control the one or more contactors;
   one or more secondary control units coupled to the contactor drive device via the second connection configured to control the one or more contactors according to the controlling signal from the vehicle control unit; and
   a fault diagnostic system configured to identify faults occurring in the first connection and the second connection.

7. The system of claim 6, wherein the vehicle control unit is configured to provide the controlling signal to the contactor system through the first connection to control the one or more contactors when there is no fault in the first connection and the second connection.

8. The system of claim 6, wherein the one or more secondary control units are configured to provide the controlling signal to the contactor system through the second connection to control the one or more contactors when a fault occurs in the first connection.

9. The system of claim 6, wherein the vehicle control unit is configured to provide the controlling signal to the contactor system through the first connection to control the one or more contactors when a fault occurs in the second connection.

10. The system of claim 6, wherein the secondary control units are configured to control the one or more contactors to open when a fault occurs in the first connection.

11. The system of claim 6, wherein the vehicle control unit comprises one or more ports coupled to one or more input devices.

12. The system of claim 6, wherein the contactor drive device comprises a logic unit coupled to the first connection and the second connection.

13. The system of claim 12, wherein the contactor drive device comprises an amplifying unit coupled to the logic unit.

14. The system of claim 6, wherein the vehicle control unit is further configured to cross-check signals being fed back from the secondary control unit to identify whether a fault occurs.

15. The system of claim 6, wherein the vehicle control unit is further configured to compare a signal being fed back from the secondary control unit and an estimation signal to identify whether a fault occurs.

16. A vehicle, comprising:
   an energy storage system;
   a motor drive system coupled to the energy storage system;
   a contactor system comprising:
      an energy storage system contactor coupled to the energy storage system;
      a motor drive system contactor coupled to the motor drive system; and
      a contactor drive device coupled to both the energy storage system contactor and motor drive system contactor;
   a vehicle control unit coupled to the contactor drive device via a first connection and a second connection configured to control the contactor system through at least one of the first connection and the second connection;
   a secondary control unit coupled to the contactor drive device via the second connection configured to control the contactor system through the second connection; and
   a fault diagnostic system configured to identify faults occurring in the first connection and the second connection.

17. The vehicle of claim 16, wherein the vehicle control unit is configured to control the contactor system through the first connection when there is no fault in the first connection.

18. The vehicle of claim 16, wherein the secondary control unit is configured to control the contactor system through the second connection when a fault occurs in the first connection.

19. The vehicle of claim 16, wherein the vehicle control unit is configured to control the contactor system through the first connection when a fault occurs in the second connection.

20. The vehicle of claim 16, wherein the secondary control unit is configured to control the contactors to open when a fault occurs in the first connection.

* * * * *